United States Patent [19]

Skinner et al.

[11] Patent Number: 4,809,994
[45] Date of Patent: Mar. 7, 1989

[54] PIPE JOINT SEAL WITH BISTABLE ELASTOMERIC SEALING PROJECTION

[75] Inventors: James W. Skinner; Fouad M. Deeb, both of Fort Wayne, Ind.

[73] Assignee: Press-Seal Gasket Corporation, Fort Wayne, Ind.

[21] Appl. No.: 919,470

[22] Filed: Oct. 16, 1986

[51] Int. Cl.$^4$ .......................... F16J 15/32; F16J 15/10
[52] U.S. Cl. ..................................... 277/207 A; 277/9; 277/34.3
[58] Field of Search ..................... 277/1, 9, 9.5, 11, 34, 277/34.3, 189, 207 A, 207 B, 226, DIG. 2

[56] References Cited

U.S. PATENT DOCUMENTS

| | | |
|---|---|---|
| 3,510,140 | 5/1970 | Hermann ............................ 277/1 X |
| 3,759,285 | 9/1973 | Yoakum . |
| 3,787,061 | 1/1974 | Yoakum . |
| 3,879,067 | 4/1975 | Keyser . |
| 4,073,048 | 2/1978 | Ditcher . |
| 4,084,827 | 4/1978 | Wolf ............................ 277/207 A X |
| 4,103,901 | 8/1978 | Ditcher . |
| 4,159,829 | 7/1979 | Ditcher ............................. 277/189 |
| 4,350,351 | 9/1982 | Martin . |

FOREIGN PATENT DOCUMENTS

| | | | |
|---|---|---|---|
| 269007 | 3/1969 | Austria ............................ 277/207 A |
| 2313625 | 12/1976 | France ............................ 277/207 A |
| 7903463 | 11/1980 | Netherlands ................ 277/DIG. 2 |
| WO81/03535 | 12/1981 | World Int. Prop. O. ...... 277/207 A |

Primary Examiner—Robert S. Ward
Attorney, Agent, or Firm—Pearne, Gordon, McCoy & Granger

[57] ABSTRACT

A gasket system for providing a fluidtight joint between a manhole riser and a sewer pipe. The gasket is formed with a mounting portion which is generally cylindrical, and provides an anchoring projection extending radially from the outer side thereof. A sealing projection is joined to the mounting portion by a hinge section. The sealing projection is placed in compression when the gasket is formed into a circle, and becomes bistable. In one position of stability, the sealing projection is substantially aligned with the mounting portion, and in the other position of stability, the sealing projection is located generally within the mounting portion. The gasket is positioned around a core, with the sealing projection aligned with the mounting portion, and is cast into an opening provided by the material of the manhole riser. In such position, the sealing projection is partially embedded within the material of the riser. Prior to installation of a sewer pipe, the sealing projection is manually released from the material of the riser and is pushed through to its other position of stability. When a sewer pipe is pressed through the gasket, the sealing projection provides substantial compression with the outer surface of the sewer pipe and a good fluidtight joint.

12 Claims, 3 Drawing Sheets

PIPE JOINT SEAL WITH BISTABLE ELASTOMERIC SEALING PROJECTION

BACKGROUND OF THE INVENTION

This invention relates generally to gaskets for sealling the joint between an opening and a cylindrical surface extending therethrough. More particularly, this invention relates to a novel and improved gasket seal particularly suitable for sealing between a manhole opening or the like and a sewer pipe and to a novel and improved method for installing such gasket.

PRIOR ART

Various types of gaskets for sealing between sewer pipes and manholes are known. Often, such gaskets are formed of an elastomeric material which is partially embedded in the adjacent wall of a manhole riser. Such gaskets usually provide an inwardly extending projection or projections which engage the outer surface of a sewer pipe extending through the gasket. Examples of such gaskets are illustrated and described in U.S. Pat. Nos. 3,759,285; 3,787,061; 3,879,067; 4,073,048; 4,103,901; and 4,350,351. Often such gaskets employ hoop clamps to assist in retaining the gasket in a manhole riser opening or clamping the gasket against the sewer pipe.

If the gasket requires hoop clamps, such clamps increase the material and labor costs or manufacture and installation, and if they are not carefully installed, seal failure can be encountered. Further, when the seals are cast into the material of the manhole and provide inwardly extending sealing projections, complex cores are required to position the gasket and confine the manhole material in order to leave the sealing projection free of such material.

SUMMARY OF THE INVENTION

There are a number of aspects to the present invention. In accordance with one important aspect of this invention, a novel and improved gasket is provided which is easily cast into the material of a manhole or the like without inwardly extending pipe sealing projections that require special cores or the like. Such gasket provides a sealing projection which is positioned in alignment with the remaining portions of the gasket during the casting operation, and which is subsequently positioned in a projecting position during installation of the sewer pipe.

In accordance with another aspect of this invention, a gasket is provided which is initially formed into a strip by low-cost extrusion processes, is subsequently cut to length and formed into a circle suitable for sealing against a cylindrical surface. When the extrusion is formed into a circle and the ends are vulcanized or otherwise connected, a radially inwardly extending sealing projection is placed in compression, causing such projection to become bistable so that the projection tends to remain at either of two positions of stability. In one position of stability, it extends in a direction which facilitates the casting without requiring special cores. In the other stable position, to which the projection is moved prior to installation of the sewer pipe, it is properly positioned for installation of the sewer pipe and for producing a fluidtight joint with the outer surface thereof.

In accordance with still another aspect of this invention, the sealing projection is connected to the main support portion of the gasket by a hinge section which allows the movement between the two stable positions mentioned above.

In accordance with a further aspect of this invention, an extruded gasket body is provided with an anchoring projection structured and supported to remain in a desired position when the extrusion is bent to form a circle and which is shaped to interlock with the material of a manhole riser or the like. Therefore, separate hoop clamps or other connecting means are not required to secure the gasket in position.

In accordance with still another aspect of this invention, a gasket mounting structure is provided in which the gasket is cast into a circular opening in a manner in which the gasket is relatively immune to damage during shipment and handling.

In accordance with still another aspect of this invention, a novel and improved method is provided for mounting a gasket in a circular opening, such as the opening in a manhole riser or the like, and for subsequently forming a fluidtight joint with a circular surface extending through such opening.

These and other aspects of this invention are illustrated in the accompanying drawings, and are more fully described in the following specification.

DETAILED DESCRIPTION OF THE DRAWINGS

Figure 1:
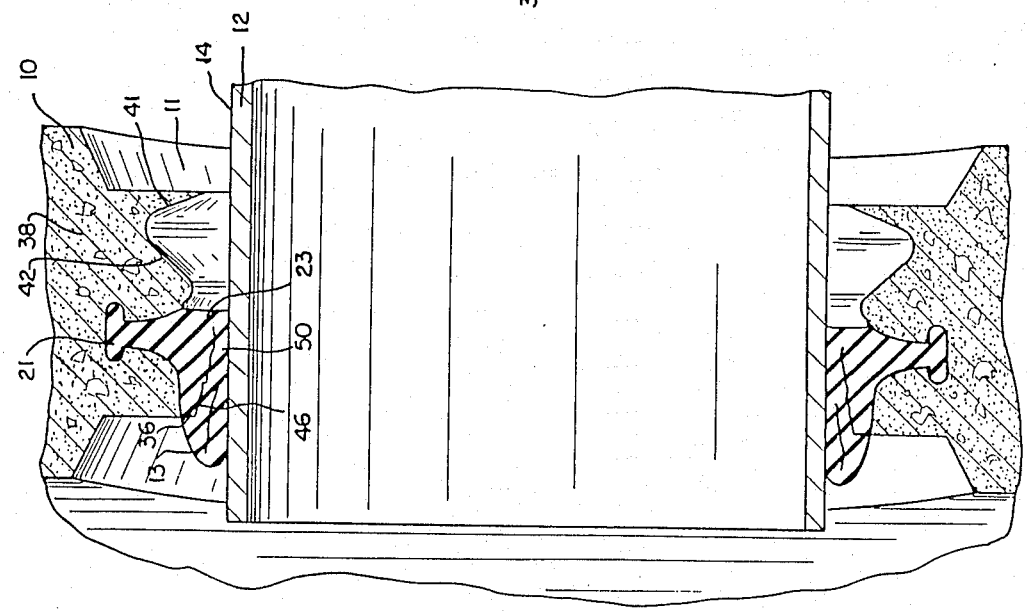
FIG. 1 is a fragmentary section of a gasket in accordance with the present invention mounted in the opening of a manhole riser or the like and providing a seal with a sewer pipe extending through such opening.

FIG. 1 illustrates a preferred embodiment of this invention installed in a manhole riser opening and sealing with a sewer pipe extending through such opening. It should be understood, however, that in accordance with this invention, such a gasket structure can be installed in other joint systems. For example, the gasket can be installed in the bell of a bell-and-spigot sewer line to provide a seal in such sewer line system, and can be used in other functionally similar installations.

The particular illustrated embodiment includes a cylindrical manhole riser 10, illustrated in fragmentary section in the drawings, providing a circular opening 11 through which a sewer pipe 12 extends. An annular seal or gasket 13 provides a fluidtight joint between the opening 11 and the cylindrical outer surface 14 of the sewer pipe 12. Such seal is constructed, as discussed below, to provide a fluidtight joint with the outer cylindrical surface even though such surface may differ in size to a substantial extent between one sewer pipe and another, and also so that a proper seal is provided even if the sewer pipe is angled a substantial amount as it extends through the opening 14.

Figure 2:
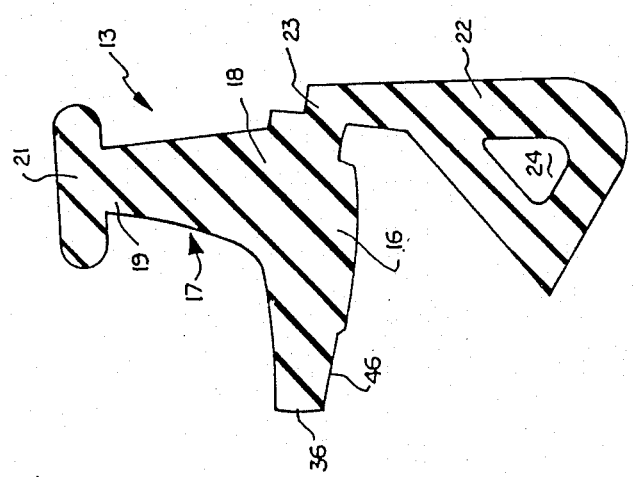
FIG. 2 is an enlarged cross section of the gasket as extruded and cured prior to forming the gasket into a circle.

Referring to FIG. 2, the seal 13 is formed from an extruded strip or body of elastomeric material having an unstressed, cured, cross-sectional shape illustrated therein. The body provides four interconnected body portions which cooperate to produce the required sealing function. The body includes a main mounting portion 16 which is generally cylindrical in shape and provides a substantial wall thickness. Extending substantially normal from the mounting portion 16 is an anchoring projection 17 having a generally T-shape in which the base of the tee at 18 is relatively thick and extends with reducing thickness to its upper end at 19. The upper end joins with an integral cross-tee portion 21 extending in opposite directions from the shank of the tee, and substantially parallel to the base portion 16.

A sealing projection 22 extends substantially normal to the mounting portion 16 in a direction opposite to the anchoring projection 17 and is joined to such mounting portion at one end thereof by a hinge section 23. Preferably, the sealing projection is hollow or tubular and is provided with a longitudinally extending bore or opening 24 therein. The gasket 13 illustrated can be easily formed in substantially any strip length desired by conventional extrusion equipment. After extrusion, the strip is vulcanized or cured in the straight, extended position.

In order to provide a circular gasket for sealing with a cylindrical surface of a sewer pipe or the like, the strip or body is cut to length and formed in a circle of appropriate size. The ends of the body are then suitably connected by adhesive or other means to provide a permanent connection between the two ends of the extruded body.

Figure 2A:
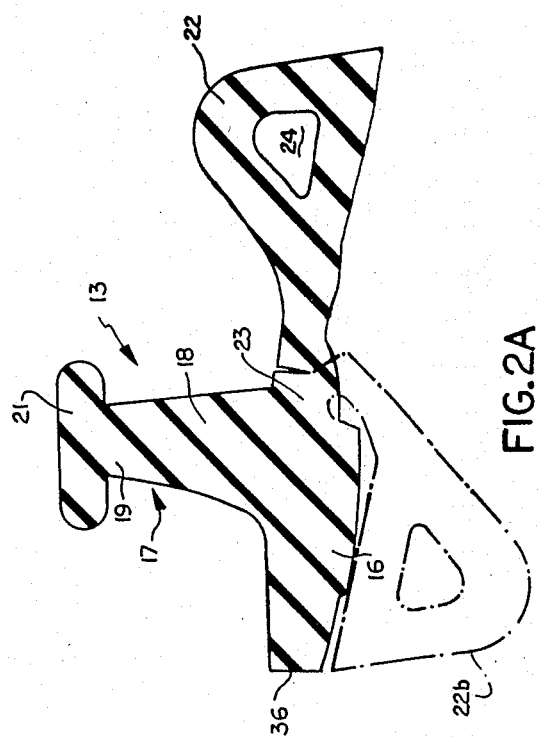
FIG. 2a is a cross section similar to FIG. 2 illustrating the positions of stability of the seal after being formed into a circle.

When the body is bent to a curved or circular shape, the projecting portion 22 is placed in compression and the anchoring portion 17 is placed in tension. The structure of the sealing projection 22 and the hinge connection provided by the section 23 causes the sealing projection 22 to become bistable in that the compressive forces in the sealing projection caused by the circular configuration urge the sealing projection 22 from its normal extruded position illustrated in FIG. 2 to either the right or left with respect to the body 16. Once the projection 22 is moved in either direction from its extruded position, the sealing projection 22 tends to remain in such position, as best illustrated in FIG. 2a. In such figure, one position of stability 22a is illustrated in full line and the other 22b is illustrated in phantom.

Because the anchoring projection 17 is formed with a relatively thick base at 18, which tapers upwardly and with reducing thickness, such anchoring projection remains substantially perpendicular to the mounting portion 16 even though the extrusion is formed into a circle and the material of the anchoring projection is placed in tension. Therefore, the anchoring projection 17 is not bistable but remains stable in its initial extruded position.

Figure 3:
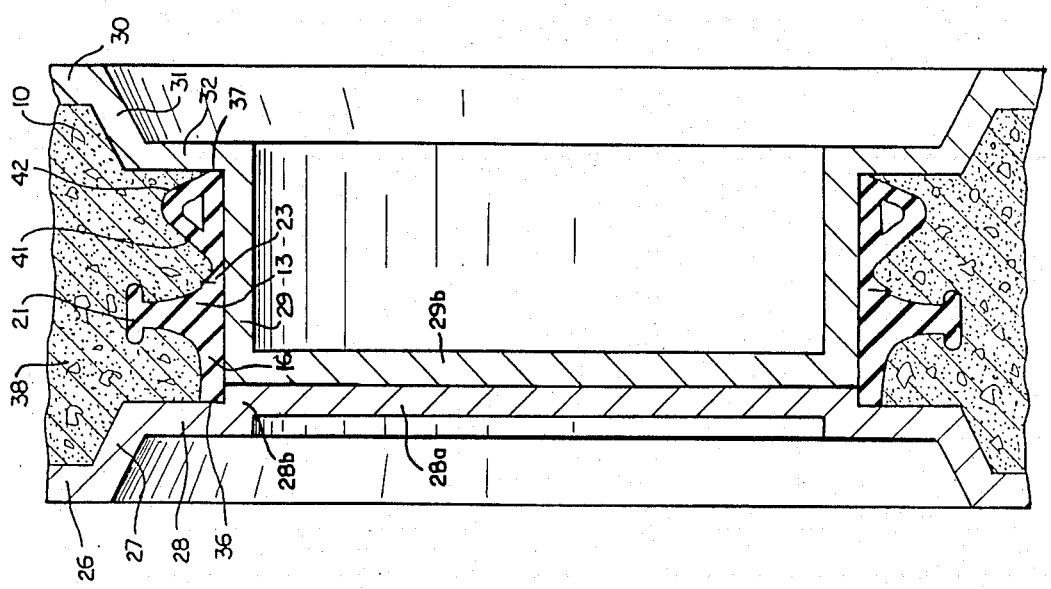
FIG. 3 is a fragmentary cross section, illustrating the gasket mounted within the manhole riser opening and schematically illustrating the adjacent sections of the mold which operates to confine the gasket and the material forming the manhole riser.

FIG. 3 illustrates the manner in which the gasket 13 is mounted within the manhole riser 10 without requiring elaborate cores to isolate the sealing projection 22 from the material forming the manhole riser. In such figure, a form is schematically illustrated to position the gasket 13 and confine the material, usually concrete, from which the manhole riser is produced. Such form includes an inner form member or assembly including a main cylindrical inner wall 26, an inner inclined transition portion 27, and an inwardly extending annular portion 28. Extending from the inner extremity of the annular portion 28 is a cylindrical core portion 28b which extends along the gasket 13 to an end wall 28a. The outer form includes an outer cylindrical wall portion 30, an inclined transition portion 31, and an inwardly extending annular portion 32. A generally cylindrical wall portion 29 extends inwardly along the gasket 13 to an end wall 29b engaging the end wall 28b. The two core portions 28b and 29 are preferably provided with a slight inward taper, which has not been illustrated because the angle of the taper is very small, in the order of 2 degrees.

A circular gasket 13 is placed over the cylndrical core portions 28b and 29 during the assembly of the inner and outer form assemblies. Such installation of the gasket 13 onto the core 29 is easily accomplished because the sealing projection 22 tends to assume a position of stability substantially in alignment with the mounting portion 16 and need be stretched only a relatively small amount to cause it to assume a portion in which its inner surface is in alignment with the inner surface of the mounting portion 16. Preferably, the gasket is sized so that the end 36 of the mounting portion 16 remote from the hinge section 23 abuts the annular wall 28 and the extremity 37 of the sealing projection engages the annular wall 32.

Such engagement between the ends of the gasket 13 tends to prevent the flow of any of the material 38 forming the manhole riser 10 into the zone between the gasket 13 and the core 29.

After the form is assembled with the gasket in place around the core portions 28b and 29, the material 38 forming the manhole riser itself is poured into the form and fills in around the gasket, as illustrated. The concrete or other matieral 38 used to form the manhole riser surrounds the anchoring projection 17 to permanently lock the gasket in position around the opening formed by the core and gasket 13 within the riser 10. Because the sealing projection 22 is held out by the core 29, it also projects up into the material 38 of the riser, but is not locked in position because the sides 41 and 42 of the projection in contact with the material 38 are inclined and do not mechanically interlock with such material.

After the cores are removed, the gasket 13 remains in the position illustrated in FIG. 3, with the outer surface of the gasket embedded in the material 38 of the riser 10. The anchoring projection, however, provides a permanent interlocking connection between the material 38 and the mounting portion 16. In such position, in which the sealing projection 22 is recessed into the material 38, the tendency for the sealing projection 22 to become damaged during shipping or handling is virtually eliminated.

In the event that the illustrated cores are required to support a gasket having a larger internal size, a cylindrical adapter core (not illustrated) can be positioned around the core portions 28b and 29 to properly position the larger gasket. Therefore, a given core can be used to cast different sizes of gaskets in a riser.

Figure 5:
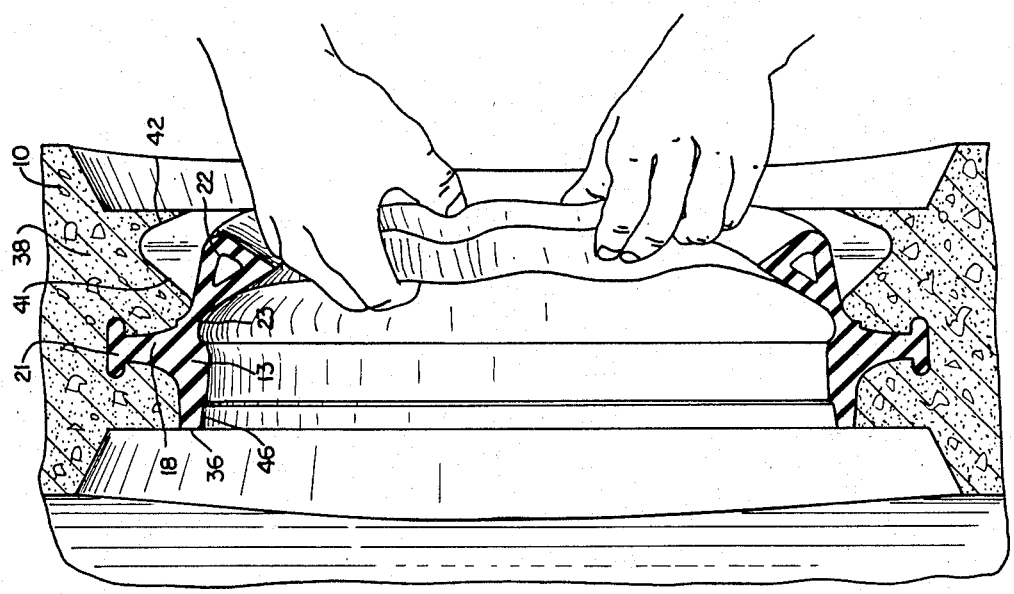
FIG. 5 is a fragmentary section, again similar to FIGS. 1, 3, and 4, illustrating the manner in which the seal projection is moved through its other position of instability as a second step in preparation for installation of a sewer pipe.
Figure 4:
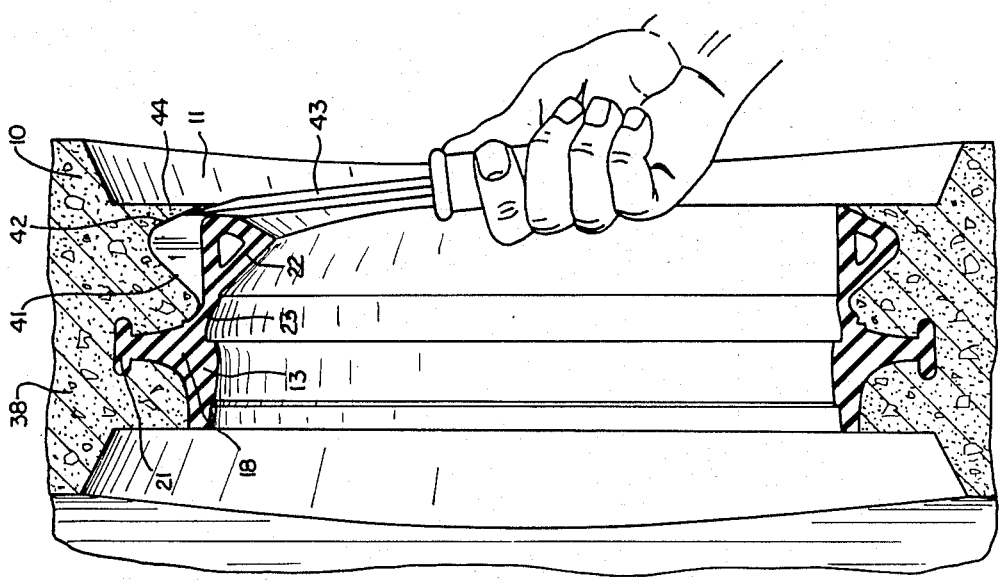
FIG. 4 is a fragmentary cross section similar to FIGS. 1 and 3, illustrating the manner in which the sealing projection is released from its cast position as the first step of preparation of the seal for installation of a sewer pipe.

When it is desired to install a sewer pipe 12, the sealing projection 22 is pried out of the material 38 in a manner best illustrated in FIGS. 4 and 5. Since no interlocking connection is provided, it is easy to insert a screwdriver or other suitable tool 43 between the lip 44 and the sealing projection to initiate removal of the sealing projection, and to thereafter grasp the sealing projection and pull it inwardly away from the opening to its first position of stability, as illustrated in FIG. 5. The sealing projection 22 is then pushed through its unstable position to the position of FIG. 6, in which the sealing projection 22 is positioned within the mounting portion 16 of the seal. As soon as the sealing projection 22 is pushed through to the position of FIG. 6, it again becomes stable in the position of FIG. 6 because of the compressive stresses within the sealing projection produced when the extruded body is formed into a circular shape.

Figure 6:
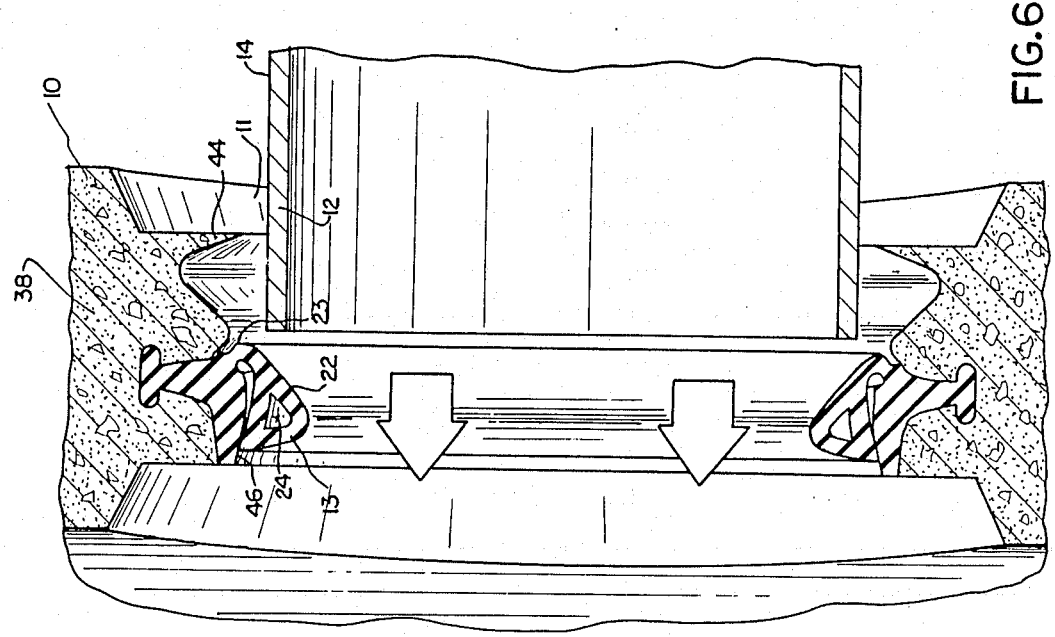
FIG. 6 is a fragmentary section similar to FIGS. 1, 3, 4, and 5, illustrating the position of the gasket and a sewer pipe as the sewer pipe is moved toward the installed position of FIG. 1.

Final assembly is accomplished by forcing the end of the sewer pipe 12 axially to the left, as viewed in FIG. 6, through the gasket so as to compress the gasket radially to the condition illustrated in FIG. 1. In such position, the material 50 of the sealing projection 22 adjacent to the hinge section 23 is stretched by the insertion of the pipe 12 and part of projection 22 projects beyond the end 36 of the mounting portion. A tight joint is provided between the inner surface of the gasket 13 and the outer surface 14 of the pipe 12. If, for example, the pipe is of somewhat lesser diameter, the amount of stretching of the material 50 of the sealing projection is reduced, but sufficient radial pressure is exerted between the pipe and the gasket to produce a good seal.

The mounting portion 13 is preferably formed with a slightly increasing diameter at 46 adjacent to the end 36 of the gasket, so that a wedging action occurs as a result of the tension forces in the material 50 produced by the insertion of the pipe into the gasket. This ensures that a substantial pressure of engagement is provided. Therefore, the camming action ensures a high contact pressure between the gasket and the outer surface 14 of the pipe 12. The same camming action produces substantial pressure between the adjacent outer surface of the mounting portion 16 and the material 38 of the riser 10. Consequently, the gasket is capable of withstanding relatively high hydraulic pressures without leakage.

If additional radial pressure is required, a hypodermic-type needle can be inserted through the wall of the projecting portion 22 into the collapsed opening 24 for the injection of a liquid sealing compound. Consequently, it is desirable to structure the gasket so that a portion of the opening 24 remains within the camming section 46. When such hypodermic-type injecting needle is removed, the walls self-seal and the sealing compound is retained within the gasket to maintain the high sealing pressure desired.

With the present invention, a simple, one-piece gasket structure is easily installed in a circular opening without requiring additional hoop clamps or the like. Further, the gasket is ready for installation of the pipe by simply loosening the sealing projection 22 and pushing it through to the position of FIG. 6, where it is stable. Consequently, a reliable seal is provided, even when installation is made by relatively unskilled personnel.

In the installed position, all of the surfaces of the pipe 12 are spaced inwardly from the adjacent surfaces of the manhole material 38 by the gasket. Consequently, it is not necessary to position the pipe in direct alignment with the opening, and the gasket will tolerate angled positions of substantial magnitude and still provide a good seal. Further, if greater degrees of angulation are required, it is a simple matter to chip away the lip 44 to provide greater clearance for angled installation of the pipe. As an alternative, the shape of the core can be modified to eliminate the formation of the lip 44.

Although the preferred embodiment of this invention has been shown and described, it should be understood that various modifications and rearrangements of the parts may be resorted to without departing from the scope of the invention as disclosed and claimed herein.

What is claimed is:

1. A gasket for providing a seal between a circular opening in a first member and an outer cylindrical surface of a second member extending through said opening, comprising a generally circular elastomeric body providing a mounting portion adapted to be mounted in said opening having a generally cylindrical inner surface, a sealing projection and a hinged section joining said sealing projection and said mounting portion, said sealing projection being movable from a mounting position axially spaced from said mounting portion, and a sealing position in which said sealing projection extends inwardly with respsect to said mounting portion, said sealing projection being adapted to resiliently engage said outer cylindrical surface when said second member extends through said opening to provide a seal between said members, said sealing projection being stable in said sealing position and also stable in a position approaching axial alignment with said mounting portion, said elastomeric body being extruded in a substantially straight condition in which said elastomeric body is substantially unstressed, forming said elastomeric body into a circle producing compressive stresses in said sealing projection causing said sealing projection to be stable in said sealing position and also stable in a position approaching axial alignment with said mounting portion.

2. A gasket as set forth in claim 1, wherein said sealing projection in said sealing position is located at least in part within said mounting portion, and said sealing projection is adapted to be compressed between said mounting portion and said cylindrical surface of said second member when said second member extends through said opening.

3. A gasket as set forth in claim 1, wherein said elastomeric body provides an anchoring projection extending radially outwardly therefrom adapted to mechanically interlock said gasket in said opening, forming said elastomeric body into a circle producing tensile stresses in said anchoring projection, said anchoring projection being structured to be stable when extending radially.

4. A gasket as set forth in claim 3, wherein said anchoring projection extends outwardly from said mounting portion and is adapted to be embedded in said first member to mechanically interlock the material forming said first member and said gasket.

5. A gasket for providing a seal between a first member having an opening and an outer surface of a second member projecting through said opening, comprising an elastomeric body providing a generally cylindrical mounting portion, a sealing projection positioned at least in part within said mounting portion and a hinged section connecting said sealing projection to one end of said mounting portion, said mounting portion providing a camming surface, said sealing projection being stretched axially in a direction away from said hinged section when said second member is inserted through said opening to produce an axial resilient force urging said sealing projection against said camming surface causing said sealing projection to be urged radially against the outer surface of said second member.

6. A gasket as set forth in claim 5, wherein said gasket includes anchoring means embedded in the material forming said first member mechanically interlocking said gasket in said opening.

7. A gasket as set forth in claim 5, wherein said gasket is embedded in the material forming said one member in a position in which said mounting portion and said sealing portion are positioned on opposite sides of said hinge section to provide a substantially cylindrical inner surface, said sealing projection being movable to said position at least partially within said mounting portion.

8. A gasket as set forth in claim 7, wherein said sealing portion is bistable and one position of stability exists when said sealing projection provides portions within said mounting portion and the other position of stability exists when said sealing portion projects substantially in alignment with said mounting portion and is located on one side thereof.

9. A gasket as set forth in claim 8, wherein said elastomeric body is extruded in a substantially straight condition and is subsequently curved to form a circle, forming said elastomeric body into a circle causing said sealing projection to be bistable.

10. A gasket as set forth in claim 5, wherein said sealing projection is tubular and provides a longitudinally extending opening therein.

11. A gasket as set forth in claim 10, wherein said second member is a sewer pipe.

12. A gasket as set forth in claim 11, wherein said first member is a manhole riser.

* * * * *

UNITED STATES PATENT AND TRADEMARK OFFICE
CERTIFICATE OF CORRECTION

PATENT NO. : 4,809,994

DATED : March 7, 1989

INVENTOR(S) : James W. Skinner and Fouad M. Deeb

It is certified that error appears in the above-identified patent and that said Letters Patent is hereby corrected as shown below:     Title page:

In the Abstract, line 1, "A gasket system" should be --A gasket system is disclosed--

Column 1, line 6, "sealling" should be --sealing--

Column 4, line 34, "portion" should be --position--

Column 4, line 49, "matieral" should be --material--

Signed and Sealed this

Twenty-sixth Day of December, 1989

Attest:

JEFFREY M. SAMUELS

Attesting Officer      Acting Commissioner of Patents and Trademarks